United States Patent
Detjen et al.

(10) Patent No.: US 9,963,233 B2
(45) Date of Patent: May 8, 2018

(54) MODULAR MONUMENT ASSEMBLY WITH SHARED WATER SYSTEM

(71) Applicant: C&D ZODIAC, INC., Huntington Beach, CA (US)

(72) Inventors: Peter Detjen, Hamburg (DE); Edward Reams, Huntington Beach, CA (US); Christoph Goeschel, Seattle, WA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days. days.

(21) Appl. No.: 15/444,123

(22) Filed: Feb. 27, 2017

(65) Prior Publication Data

US 2017/0166311 A1     Jun. 15, 2017

Related U.S. Application Data

(63) Continuation of application No. 14/072,749, filed on Nov. 5, 2013.

(60) Provisional application No. 61/722,327, filed on Nov. 5, 2012, provisional application No. 61/858,073, filed on Jul. 24, 2013.

(51) Int. Cl.
| | |
|---|---|
| *E03C 1/01* | (2006.01) |
| *B64D 11/02* | (2006.01) |
| *B64D 11/04* | (2006.01) |
| *B64D 11/00* | (2006.01) |

(52) U.S. Cl.
CPC .............. *B64D 11/02* (2013.01); *B64D 11/04* (2013.01); *B64D 2011/0046* (2013.01)

(58) Field of Classification Search
USPC .................................. 4/601, 605; 244/118.5
See application file for complete search history.

(56) References Cited

U.S. PATENT DOCUMENTS

| | | | |
|---|---|---|---|
| 4,871,452 A | 10/1989 | Kohler | |
| 5,309,938 A | 5/1994 | Ellgoth | |
| 8,074,933 B2 | 12/2011 | Mackulin | |
| 2005/0126927 A1 | 6/2005 | Lindauer | |
| 2010/0051519 A1 | 3/2010 | Maier-Witt | |
| 2012/0012706 A1 | 1/2012 | Ehlers | |

FOREIGN PATENT DOCUMENTS

| | | | | |
|---|---|---|---|---|
| EP | 2873616 A1 * | 5/2015 | ............. | B64D 11/04 |
| WO | WO 2012110643 A1 * | 8/2012 | ............. | B64D 11/02 |

OTHER PUBLICATIONS

EP2873616.*
PCT/US2013/068598 International Search Report & Written Opinion dated Apr. 4, 2014.

* cited by examiner

*Primary Examiner* — Lauren Crane
(74) *Attorney, Agent, or Firm* — Jeffer Mangels Butler & Mitchell LLP; Brennan C. Swain, Esq.

(57) ABSTRACT

A modular monument assembly configured to be positioned in an aircraft that includes an enclosure that includes a first module and a second module, and a circulation system that is adapted to receive water from a water source. The circulation system includes a circulation line for circulating water, a water heater, a circulation pump, first and second faucets and first and second lines that are in fluid communication with the first and second faucets. The first faucet is positioned in the first module and the second faucet is positioned in the second module.

4 Claims, 6 Drawing Sheets

MODULAR MONUMENT ASSEMBLY WITH SHARED WATER SYSTEM

CROSS REFERENCE TO RELATED APPLICATIONS

This application is a continuation of U.S. patent application Ser. No. 14/072,749, filed Nov. 5, 2013, which claims the benefit of U.S. Provisional Application No. 61/722,327 filed Nov. 5, 2012, and U.S. Provisional Application No. 61/858,073 filed Jul. 24, 2013 which are both herein incorporated by reference in their entireties.

FIELD OF THE INVENTION

The present invention relates generally to aircraft monuments and more particularly to aircraft monuments that include shared water system components.

BACKGROUND OF THE INVENTION

Commercial aircraft, such as the Airbus A320 or Boeing 737, are typically constructed from modular components; the size, weight and construction of which are dictated by many considerations, including fuselage dimensions, aesthetics and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include galleys for use by the crew for storing food and the like and lavatories for use by the crew and passengers.

Lavatories and galleys on commercial aircraft have traditionally been separate monuments. Each structure is isolated in terms of structure, plumbing, electric power, and geometry. Lavatories and galleys are arranged and installed in aircraft separately. Monuments with more than one lavatory and/or galley are known. However, each lavatory or galley within the monument typically includes separate system connections and components (e.g., potable water, gray water, water heater, water filter, etc.) that connect to the aircraft interfaces. For galley/lavatory modules or monuments sharing a common structure or being in close proximity it would allow significant system and weight improvements to share a common system port to use shared components for identical or similar functions or to share a water heater and/or water filter.

SUMMARY OF THE PREFERRED EMBODIMENTS

In accordance with a first aspect of the present invention there is provided a modular monument assembly configured to be positioned in an aircraft that includes an enclosure that includes a first module and a second module, and a circulation system that is adapted to receive water from a water source. The circulation system includes a circulation line for circulating water, a water heater, a circulation pump, first and second faucets and first and second lines that are in fluid communication with the first and second faucets. The first faucet is positioned in the first module and the second faucet is positioned in the second module. In a preferred embodiment, the water heater, water pump, circulation line and first line are positioned in the first module, and the second line is positioned in the second module. Preferably, the circulation system further comprises a water filter positioned in the first module. In a preferred embodiment, the modular monument assembly includes a potable water system that includes a potable water port. The potable water system is configured to provide water to the circulation system. The modular monument assembly also includes a gray water system that includes a gray water port, a first sink positioned in the first module, a second sink positioned in the second module, and lines connecting the gray water port, first sink and second sink. Preferably, the first module is a first lavatory and the second module is a second lavatory and the potable water system includes a toilet rinse valve positioned in the first lavatory and a toilet rinse valve positioned in the second lavatory.

In a preferred embodiment the modular monument assembly includes a third module that is a galley and that includes a third sink positioned therein that is part of the gray water system. Preferably, there is at least one water using component positioned in the galley that is configured to receive water from the potable water system. In a preferred embodiment, with the third module included, the water heater, water pump, circulation line and first line are positioned in the first lavatory, and the second line is positioned in the second lavatory. In a preferred embodiment, the water pump, circulation line and first line are positioned in the first lavatory, the second line is positioned in the second lavatory and the water heater is positioned in the galley. With this configuration, the water heater is configured to provide hot water to at least the circulation system and a hot water using component positioned in the galley.

In accordance with another aspect of the present invention there is provided an aircraft that includes a modular monument assembly that comprises an enclosure that includes a first lavatory and a second lavatory separated by a wall and a circulation system. The first lavatory includes a first sink and a first toilet positioned therein, and the second lavatory includes a second sink and a second toilet positioned therein. The circulation system includes a circulation line for circulating water, a water heater, a water filter, a circulation pump, first and second faucets and first and second lines that are in fluid communication with the first and second faucets. The first faucet is positioned in the first lavatory and the second faucet is positioned in the second lavatory. The water heater, water filter, water pump, circulation line and first line are positioned in the first module, and the second line is positioned in the second lavatory.

In a preferred embodiment, the aircraft further includes therein a potable water system that includes a potable water port associated with the enclosure, a first toilet rinse valve positioned in the first lavatory and a second toilet rinse valve positioned in the second lavatory. The potable water system is configured to provide water to the circulation system, the first toilet rinse valve and the second toilet rinse valve. Preferably, the aircraft also includes a gray water system that includes a gray water port, the first sink, the second sink and lines connecting the gray water port, first sink and second sink.

DETAILED DESCRIPTION OF THE PREFERRED EMBODIMENTS

Figure 1:
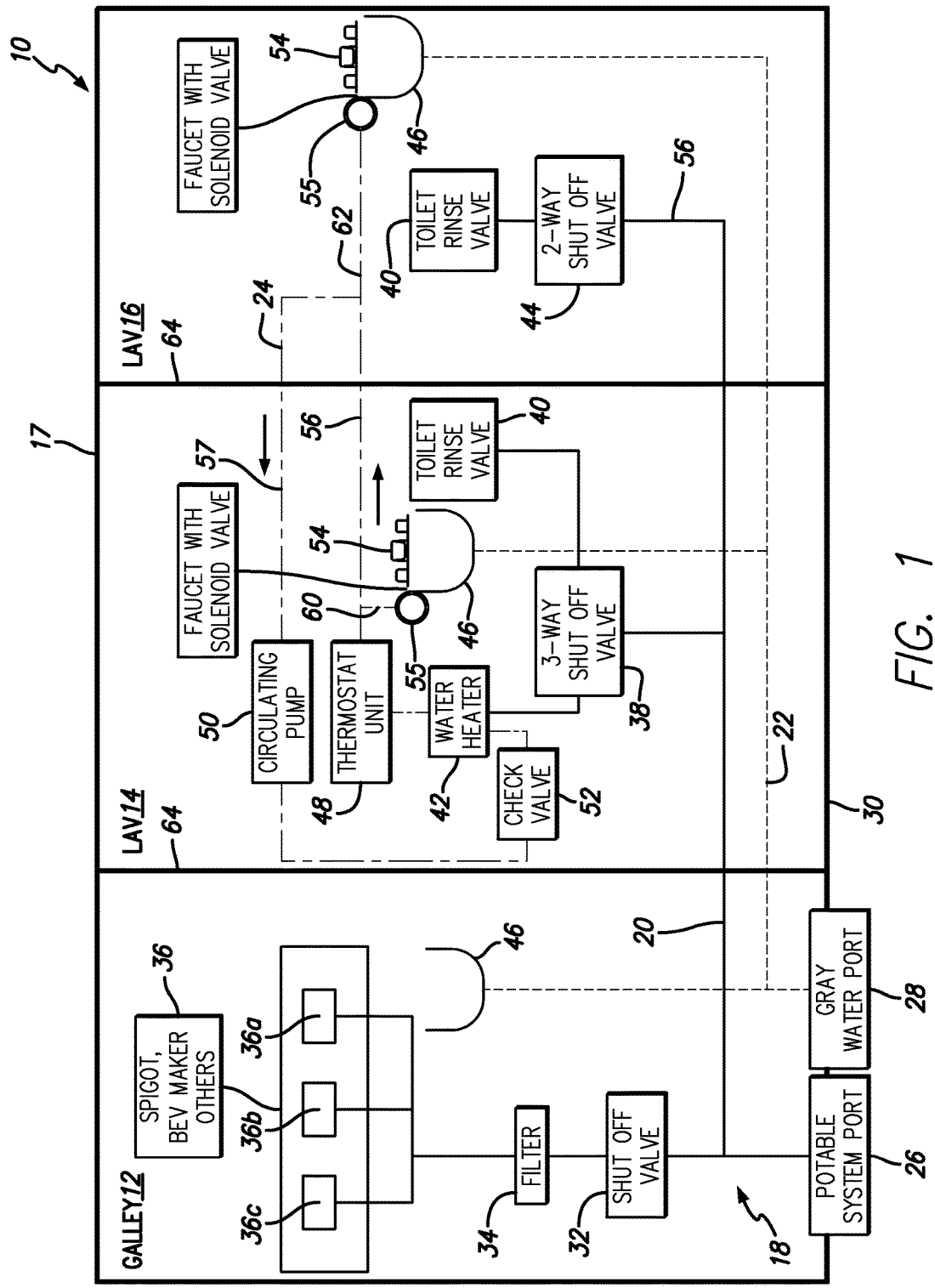
FIG. 1 is a schematic view of a modular monument assembly that includes three modules in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, FIGS. 1-5 show embodiments of modular monument assemblies that include at least some shared system components. In particular, the invention can be used on commercial passenger aircraft. However, this is not a limitation on the present invention and the modular monument assemblies can be used elsewhere. The modular monument assemblies can include any number of modules therein. More specifically, the modular monument assemblies can include any combination of lavatories and/or galleys therein.

FIG. 1 shows an embodiment of a modular monument assembly 10 that includes first, second and third modules therein. Specifically, in this embodiment, the modular monument assembly includes a galley 12 and first and second lavatories 14 and 16. As shown in FIG. 1, the modular monument assembly 10 comprises an enclosure 17 that includes therein a water system 18 that includes generally a potable water system 20 shown in solid lines, a gray water system 22 shown in dashed lines, and a circulation system 24 shown in center lines. The potable water system 20 includes a potable system port 26 and the gray water system 22 includes a gray water port 28. In a preferred embodiment, the ports 26 and 28 are positioned on a wall 30 of the modular monument assembly 10, such that they can be operatively connected to the aircraft's water system. In FIG. 1, the ports 26 and 28 are positioned in the galley 12. However, this is not a limitation and they can be positioned in either of the first or second lavatories 14 and 16 (or other module) as well.

As is shown in FIG. 1, in a preferred embodiment, the potable water system 20 branches to the galley 12 and the first and second lavatories 14 and 16. Potable water enters at the potable system port 26. In the galley 12, the potable water system 20 includes a shut off valve 32 and filter 34 prior to running to the water using components 36, such as a spigot/faucet 36a, beverage maker 36b and others 36c. In the first lavatory 14, the potable water system 20 includes a three-way shut off valve 38 and extends to a toilet rinse valve 40 and a water heater 42. In the second lavatory 16, the potable water system 20 includes a two-way shut off valve 44 and extends to a toilet rinse valve 40.

The gray water system 22 shown in FIG. 1 branches to the galley 12 and the first and second lavatories 14 and 16. Sinks 46 are preferably included in the galley 12 and the first and second lavatories 14 and 16. As shown in FIG. 1, the water that drains from all three sinks 46 runs through the gray water system 22 and to the gray water port 28.

As shown in FIG. 1, in a preferred embodiment, the circulation system 24 circulates warm water between the first and second lavatories 14 and 16. Generally, the circulation system 24 includes the water heater 42, a thermostat unit 48 (which may be part of the water heater 42), a circulation pump 50, a check valve 52 and faucets 54 that are associated with the sinks 46 in the first and second lavatories 14 and 16. In a preferred embodiment, the faucets 54 include a solenoid valve 55. However, this is not a limitation on the present invention. A filter can also be included in the system. In use, water is heated in the water heater 42 (which receives water via the potable water system 20) and fed through the thermostat unit 48 that helps maintain the water at a predetermined temperature and then is circulated by the circulation pump 50 through the lines 56 (and the filter, if included) and to the faucets 54, as necessary. This keeps the water in the faucets 54 warm and ready for use by aircraft patrons.

Figure 2:
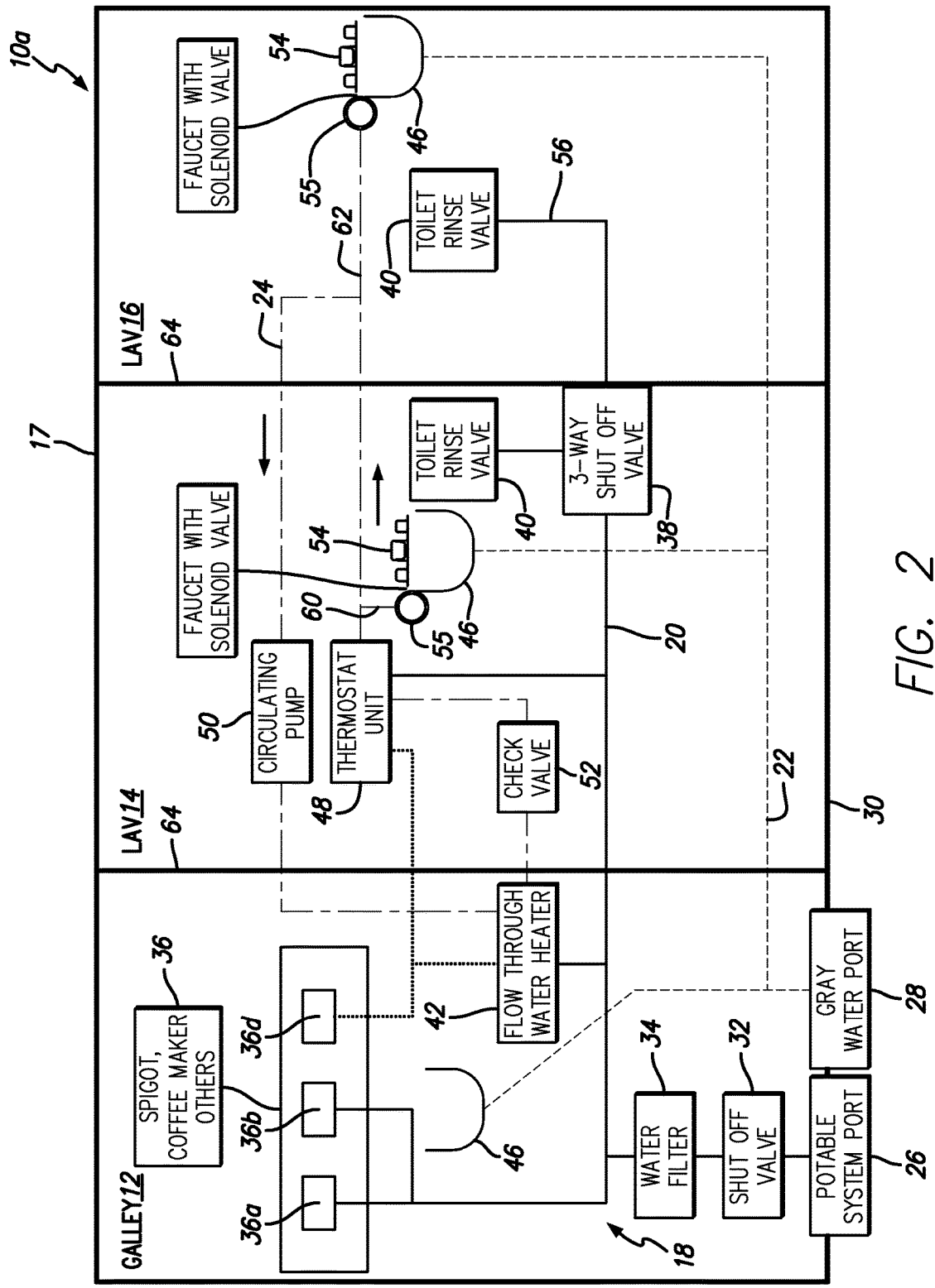
FIG. 2 is a schematic view of another modular monument assembly that includes three modules in accordance with a preferred embodiment of the present invention.

FIG. 2 shows another embodiment of a modular monument assembly 10*a* similar to the embodiment described above and that also includes a galley 12 and first and second lavatories 14 and 16. In this embodiment, the water heater 42 provides hot water to the first and second lavatories 14 and 16 and also to the galley 12. The water flowing from the hot water heater 42 to the thermostat unit 48 and a hot water using component 36*d* (which may, for example, be a coffee maker) is represented by the dotted line in FIG. 2. Any type of water heater can be used. For example a water heater that provides 1 L, 3 KW, and 85° C. can be used.

Figure 3:
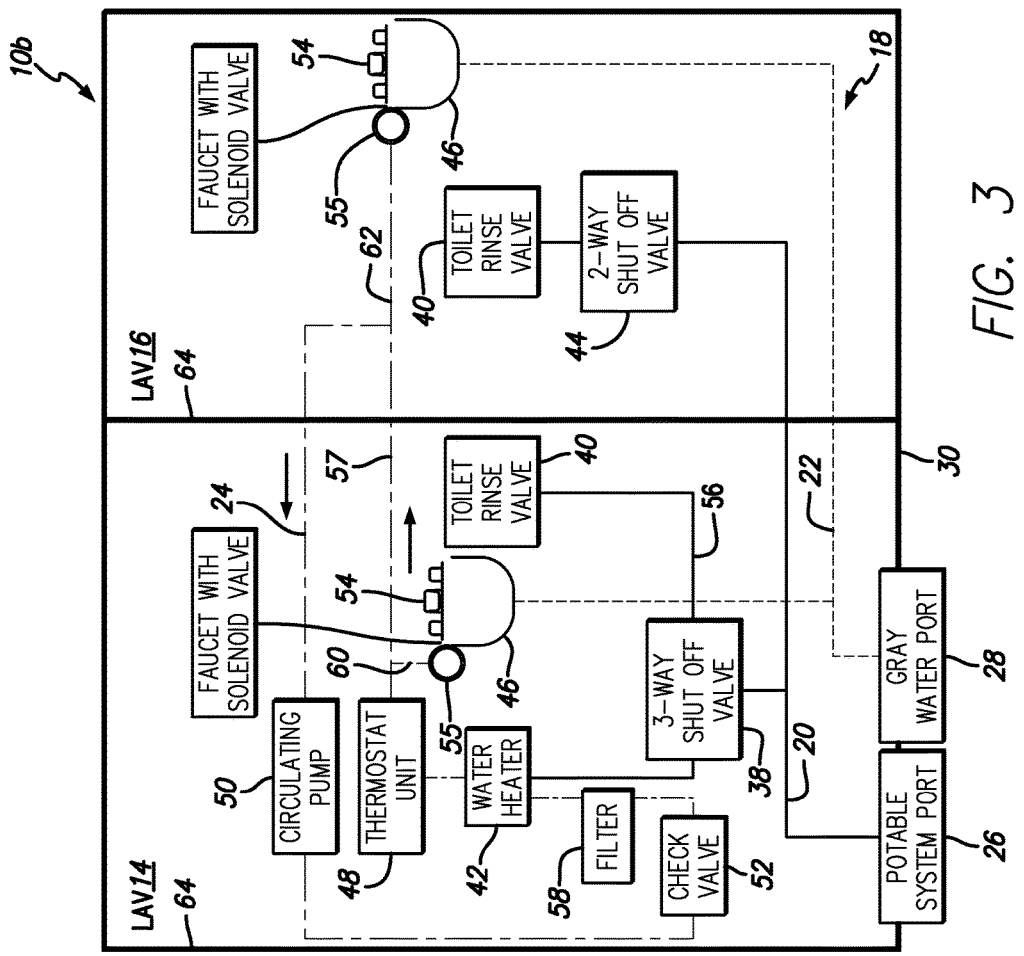
FIG. 3 is a schematic view of a modular monument assembly that includes two modules in accordance with a preferred embodiment of the present invention.

FIG. 3 shows another embodiment of a modular monument assembly 10*b* similar to the embodiments described above and that includes first and second lavatories 14 and 16. In this embodiment, the potable water system 20, gray water system 22 and circulation system 24 are all shared between the first and second lavatories 14 and 16. Also, the potable system port 26 and gray water port 28 are both located in one of the first or second lavatories 14 and 16.

It will be appreciated that FIGS. 1-3 are schematic views of the modular monument assemblies 10, 10*a* and 10*b* and that the positioning of the components in the figures is not intended to be limiting. For example, the water heater 42 is shown positioned in FIG. 1 in the first lavatory 14. However, it can also be positioned in the galley 12 or the second lavatory 16. Furthermore, the valves and filters, etc. can be positioned differently and can be omitted in certain embodiments. It will be appreciated that other lines and systems may be included in the modular monument assemblies. For example, a waste system for flushing the toilets will likely be included in practical use. Furthermore, the potable water system 20 may run to the faucets 54 in the first and second lavatories 14 and 16 and bypass the circulation system 24 and water heater 42 to provide cold water.

Figure 4:
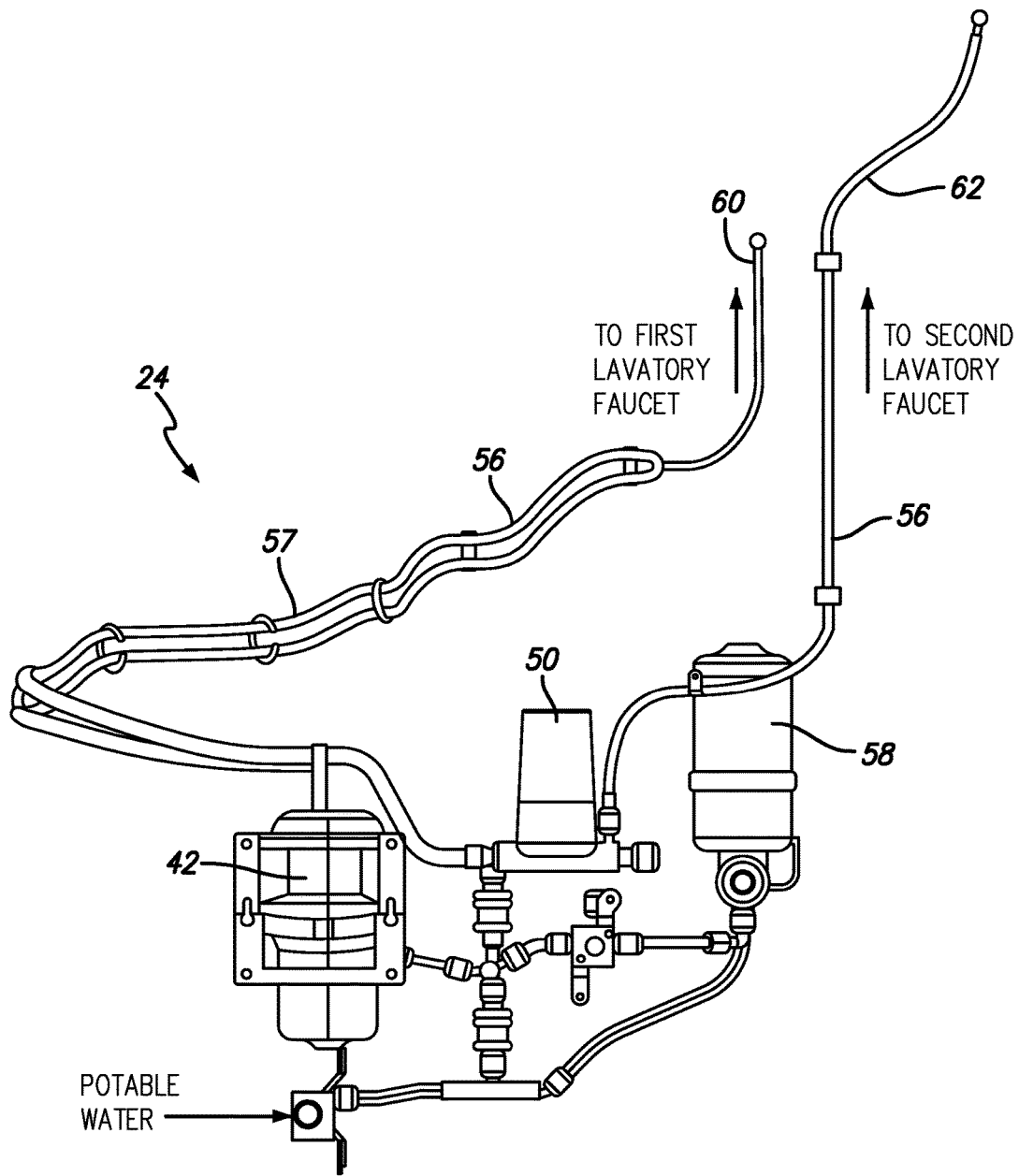
FIG. 4 is an elevational view of a circulation system that can be used in a modular monument assembly.
Figure 5:
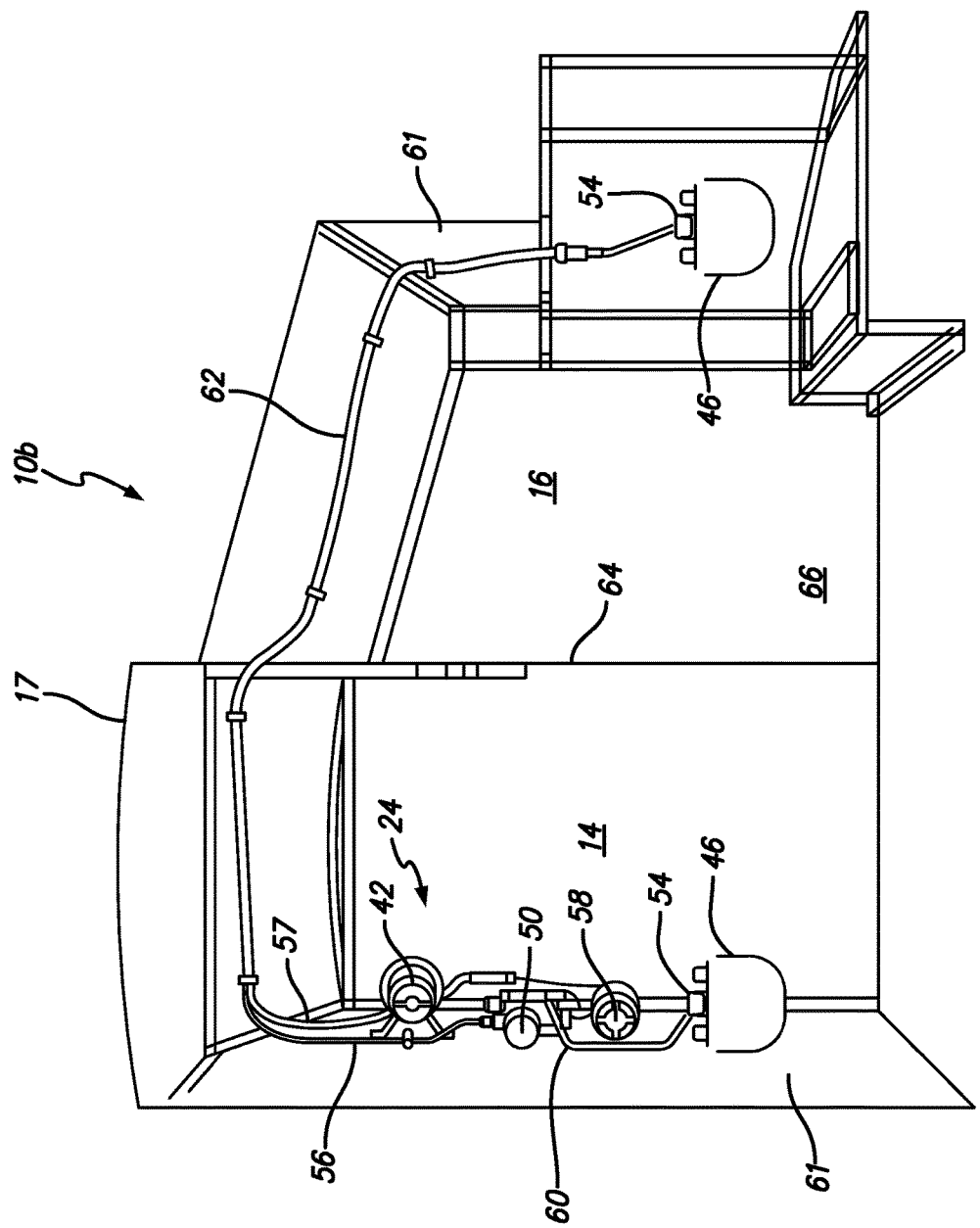
FIG. 5 is an elevational view of a modular monument assembly that includes two modules and a circulation system in accordance with a preferred embodiment of the present invention.
Figure 6:
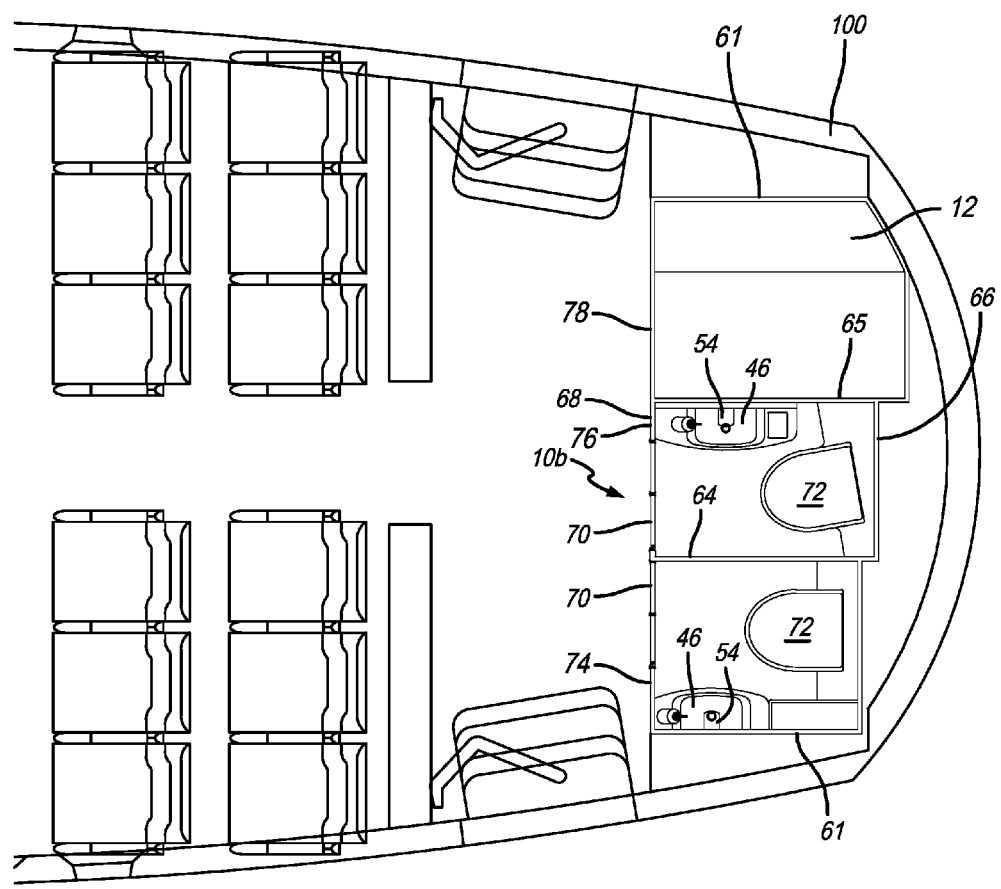
FIG. 6 is a plan view of the aft portion of an aircraft with a modular monument assembly disposed therein.

FIGS. 4-6 show an embodiment of modular monument assembly 10*b* that includes the circulation system 24 installed in an enclosure 17 that includes first and second lavatories 14 and 16. It will be appreciated that this can be a standalone monument or can be combined with a galley monument 12. The enclosure 17 includes side walls 61, a first dividing wall 64, a second dividing wall 65, a rear wall 66, a front wall 68 that includes doors 70 (FIG. 6) that provide access to the first and second lavatories 14 and 16, outboard lavatory forward wall 74, inboard lavatory forward wall 76 and galley forward wall 78. The outer surfaces of the galley forward wall 78, the inboard lavatory forward wall 76, the outboard lavatory forward wall 74, the inboard lavatory door 70 and the outboard lavatory door 70 all lie in generally the same plane.

As shown in FIG. 4, the circulation system 24 includes water heater 42, circulation pump 50, a circulation line/hose 57, a filter 58 and a first line 60 that extends to the first faucet 54 and a second line 62 that extends to the second faucet 54. As shown in FIG. 4, the bulk of the circulation system 24 is installed in the first lavatory 14 and a line 56 extends into the second lavatory 16 and to the faucet 54 therein. In another embodiment, the bulk of the circulation system 24 can be positioned in the second lavatory 16. It will be appreciated by those of skill in the art, that the circulation system 24 provides a single water heater 42 and water filter 58 together with a circulation pump 50 that keeps water in the hoses/lines 56, 57, 60 or 62 warm. By eliminating a water heater in the second lavatory 16 there is a weight and space benefit compared to the prior art. It will be appreciated that in another embodiment, the water heater and filter (and other components) can be included in the second lavatory 16 instead of the first lavatory.

Any of the modular monument assemblies 10, 10*a* or 10*b* can be positioned in an aircraft 100. FIG. 6 shows modular monument assembly 10*b* positioned in an aircraft 100. Generally, the enclosure 17 includes side walls 61, dividing wall 64, rear wall 66, front wall 68, doors 70, sinks 46, toilets 72 (which may be sit down toilets or urinals) and other components that are typically used or present in aircraft lavatories.

It will be appreciated that the modular monument assemblies and the enclosures thereof may be unitary and include the lavatories/galleys within a single structure or may be separate structures that are positioned adjacent one another, but that still include shared components, as described above. In another embodiment, the modular monument assembly only includes a lavatory and a galley.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A lavatory and galley arrangement configured to be positioned in an aircraft, the arrangement comprising:
    a structure,
    a galley positioned on a first side of the structure, wherein the galley includes a galley forward wall having an outer surface,
    an outboard lavatory positioned on a second side of the structure, wherein the outboard lavatory includes an outboard lavatory forward wall having an outer surface, and wherein the outboard lavatory forward wall includes an outboard lavatory door having an outer surface, and
    an inboard lavatory positioned between the galley and the outboard lavatory, wherein the inboard lavatory includes an inboard lavatory forward wall having an outer surface, and wherein the inboard lavatory forward wall includes an inboard lavatory door having an outer surface,
    wherein the structure includes a first divider wall separating the galley and the inboard lavatory, and a second divider wall separating the inboard lavatory and the outboard lavatory, wherein the galley forward wall, outboard lavatory forward wall and inboard lavatory forward wall form a structure forward wall, and wherein the outer surfaces of the galley forward wall, the inboard lavatory forward wall, the outboard lavatory forward wall, the inboard lavatory door and the outboard lavatory door all lie in generally the same plane.

2. The lavatory and galley arrangement of claim 1 wherein the second divider wall extends between a structure rear wall and the structure forward wall.

3. The lavatory and galley arrangement of claim 2, wherein the first divider wall extends between the structure rear wall and the structure forward wall.

4. The lavatory and galley arrangement of claim 3 wherein the inboard and outboard lavatories each include a toilet positioned therein, and wherein the toilet in the inboard lavatory is positioned further from the structure forward wall than the toilet in the outboard lavatory.

* * * * *